(12) United States Patent
Sanz et al.

(10) Patent No.: US 10,294,824 B2
(45) Date of Patent: May 21, 2019

(54) COMPRESSED GAS ENERGY STORAGE AND RESTITUTION SYSTEM AND METHOD

(71) Applicant: IFP Energies nouvelles, Rueil-Malmaison (FR)

(72) Inventors: Elena Sanz, Francheville (FR); Willi Nastoll, Lyons (FR); Guillaume Vinay, Rueil-Malmaison (FR); Cecile Plais, Les Haies (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 193 days.

(21) Appl. No.: 15/366,978

(22) Filed: Dec. 1, 2016

(65) Prior Publication Data

US 2017/0226900 A1    Aug. 10, 2017

(30) Foreign Application Priority Data

Dec. 4, 2015    (FR) .................................... 15 61875

(51) Int. Cl.

| | |
|---|---|
| *F01K 13/00* | (2006.01) |
| *F02C 6/16* | (2006.01) |
| *F28D 20/00* | (2006.01) |
| *F28D 20/02* | (2006.01) |
| *F01K 3/12* | (2006.01) |

(52) U.S. Cl.
CPC .............. *F01K 13/006* (2013.01); *F01K 3/12* (2013.01); *F02C 6/16* (2013.01); *F28D 20/0056* (2013.01); *F28D 20/02* (2013.01); *F28D 20/026* (2013.01); *F28D 20/028* (2013.01); *F28F 2270/00* (2013.01); *Y02E 60/142* (2013.01); *Y02E 60/145* (2013.01); *Y02E 60/15* (2013.01)

(58) Field of Classification Search
CPC .. F01K 13/006; F01K 3/12; F02C 6/16; F02C 9/18; F28D 20/0056; F28D 17/02
See application file for complete search history.

(56) References Cited

U.S. PATENT DOCUMENTS

| | | | | |
|---|---|---|---|---|
| 4,463,799 A | * | 8/1984 | Takahashi | C09K 5/06 165/10 |
| 7,923,112 B2 | * | 4/2011 | Christ | C09K 5/063 165/185 |
| 8,544,275 B2 | * | 10/2013 | Shinnar | F01K 3/00 126/617 |
| 8,739,522 B2 | | 6/2014 | Anikhindi et al. | |
| 9,709,347 B2 | * | 7/2017 | Howes | F28D 20/0056 |
| 9,726,082 B2 | * | 8/2017 | Tothill | F01K 3/08 |

(Continued)

FOREIGN PATENT DOCUMENTS

| | | |
|---|---|---|
| EP | 2447501 A2 | 5/2012 |
| EP | 2530283 A1 | 12/2012 |

(Continued)

*Primary Examiner* — Mark A Laurenzi
*Assistant Examiner* — Shafiq Mian
(74) *Attorney, Agent, or Firm* — Fitch, Even, Tabin & Flannery LLP

(57) ABSTRACT

The invention comprises at least one gas compressor, at least one compressed gas storage, at least one expander for expanding the compressed gas for generating energy, and at least one heat storage, wherein the heat storage comprises a staged arrangement at least two fixed beds of heat storage particles and at least one discontinuity in a thermal gradient located between two adjacent beds.

21 Claims, 5 Drawing Sheets

(56) References Cited

U.S. PATENT DOCUMENTS

| | | | |
|---|---|---|---|
| 9,841,243 B2* | 12/2017 | Oliva Llena | F28D 20/0056 |
| 2011/0094231 A1* | 4/2011 | Freund | F02C 1/02 |
| | | | 60/727 |
| 2011/0100010 A1 | 5/2011 | Freund et al. | |
| 2012/0102937 A1 | 5/2012 | Anikhindi et al. | |
| 2013/0105106 A1* | 5/2013 | Goswami | F28D 20/026 |
| | | | 165/10 |
| 2015/0114591 A1* | 4/2015 | Howes | F28D 20/0056 |
| | | | 165/10 |
| 2016/0216044 A1* | 7/2016 | Narine | F02C 1/04 |

FOREIGN PATENT DOCUMENTS

| | | |
|---|---|---|
| FR | 3014182 A1 | 6/2015 |
| WO | 2011/053411 A1 | 5/2011 |

* cited by examiner

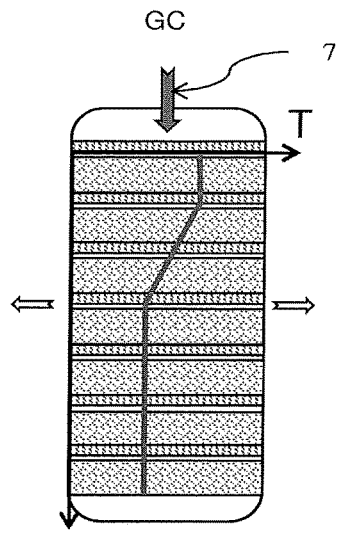
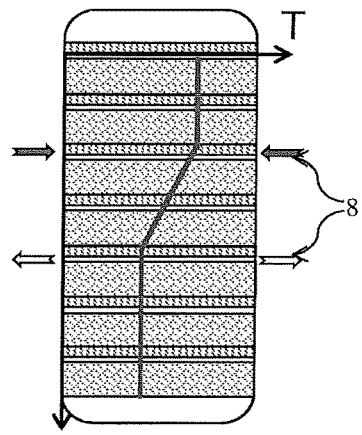
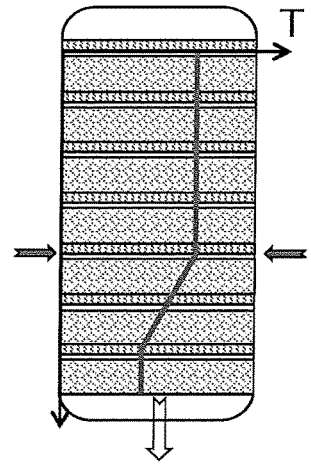
Figure 7a          Figure 7b          Figure 7c
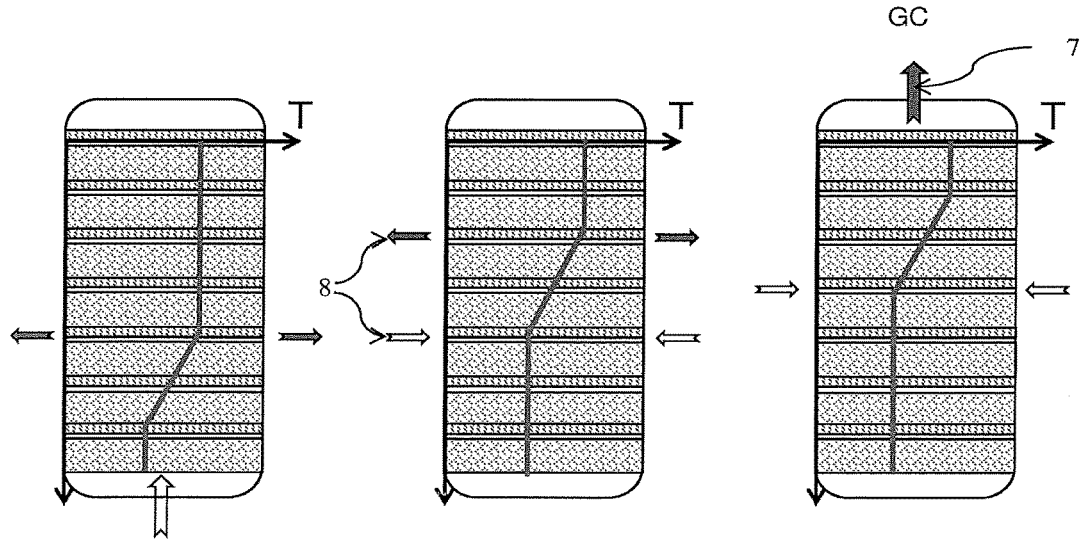
Figure 8a          Figure 8b          Figure 8c

COMPRESSED GAS ENERGY STORAGE AND RESTITUTION SYSTEM AND METHOD

CROSS-REFERENCE TO RELATED APPLICATIONS

Reference is made to French Patent Application no. 15/61.875 filed Dec. 4, 2015, which is incorporated herein by reference in its entirety.

BACKGROUND OF THE INVENTION

Field of the Invention

The present invention relates to compressed gas energy storage (CAES which stands for Compressed Air Energy Storage). In particular, the present invention relates to an AACAES (Advanced Adiabatic Compressed Air Energy Storage) system, which provides for the storage of the gas and the storage of the generated heat.

Description of the Prior Art

In a compressed air energy storage (CAES) system, the energy, which is to be used at some later point in time, is stored in the form of compressed air. For storage, energy, notably electrical energy, drives air compressors and, for release, the compressed air drives turbines, which may be connected to an electric generator. The efficiency of this solution is suboptimal because some of the energy of the compressed air is in the form of heat which is not used. Specifically, in CAES methods, only the mechanical energy of the air is used, which means that all of the heat produced at the time of compression is discarded. By way of example, air compressed to 8 MPa (80 bar) heats up during compression to around 423 K (which is around 150° C.), but is cooled prior to storage. In addition, the efficiency of a CAES system is suboptimal because the system then requires the stored air to be heated in order to cause the air to expand.

Specifically, if the air is stored at 8 MPa (80 bar) and ambient temperature, and if the energy is to be recuperated through an expansion, the decompression of the air once again follows an isentropic curve, but this time from the initial storage conditions (approximately 8 MPa and 300 K). The air therefore cools down to unrealistic temperatures (83 K which is −191° C.). It is therefore necessary to heat it, something which can be done using a gas burner or a burner operating on some other fuel.

Several variants of this system currently exist. Particular mention may be made of the following systems and methods:

- ACAES (Adiabatic Compressed Air Energy Storage) in which the air is stored at the temperature caused by the compression. However, this type of system requires a special storage system that is bulky and expensive because it requires the entire air storage volume to be thermally insulated.
- AACAES (Advanced Adiabatic Compressed Air Energy Storage) in which the air is stored at ambient temperature and the heat due to the compression is also stored, separately, in a TES (Thermal Energy Storage) heat storage system. The heat stored in the TES is used to heat the air before it expands.

A first envisioned solution for the TES heat storage system is to use a heat-transfer fluid that allows the heat derived from the compression to be stored in order to be restituted to the air prior to expansion using heat exchangers. For example, the European Patent Application 2447501 describes an AACAES system in which oil, used as a heat-transfer fluid, circulates in closed circuit to exchange heat with the air. Moreover, patent applications EP 2530283 and WO 2011053411 describe an AACAES system in which the exchanges of heat are performed by a heat-transfer fluid circulating in closed circuit, comprising a single reservoir of heat-transfer fluid.

However, the systems described in these patent applications require specific means for storing and circulating the heat-transfer fluid. In addition, with these systems, significant pressure drops are generated by the heat exchangers which are used.

A second solution envisioned for the TES heat storage system relies on static storage of heat (with no movement of the storage material). In this case, the thermal gradient in the heat storage system needs to be maintained properly because it allows a constant cold temperature and a constant hot temperature to be maintained and therefore makes it possible to ensure better transfer of heat during charging and discharging. This is of particular importance with regard to maintaining the efficiency of the system during the various charging and discharging cycles. In order to meet this requirement, static solid heat storages have been proposed. In order to obtain this thermal stratification with a solid heat storage, it is possible to use a heat storage using a fixed bed of solid particles through which the fluid that is to be cooled passes. However, during the charging and layering of the particles, heterogeneities, responsible for a nonuniform porosity, may appear within the bed, and this may impede the preferred passages of fluid and therefore leading to a non-uniform thermal gradient (with cold zones and hot zones present at different points on the bed). Moreover, this effect is further accentuated during operation of the system as a result of the expansion of the particles as the hot fluid passes, which greatly degrades the heat storage and restoration performance.

Patent application FR 3014182 describes an AACAES system in which the heat storage and restoration system comprises a plurality of heat storages staged at the outlet of each compression stage with each heat storage having its own heat storage temperature. This system, while allowing satisfactory control over the thermal gradient, is, because of the proliferation of the storages is relatively expensive and less operable.

SUMMARY OF THE INVENTION

In order to alleviate these disadvantages while at the same time allowing control over the thermal gradient, the present invention relates to a compressed gas energy storage and energy restoration system and method (for example of the AACAES type, namely involving air) in which the heat storage is formed of a staged arrangement of at least two fixed beds of heat storage particles and comprises at least one means which induces at least one discontinuity in the thermal gradient between two adjacent beds. This implementation may allow controlled thermal stratification within the heat storage and notably avoids the formation of cold pockets which detract from the effectiveness of the system. In addition, this objective may be achieved within one and the same single heat storage, making the system according to the invention more operable and in comparison with the prior art. Thus, the system according to the invention makes it possible to increase the overall efficiency of the compressed gas energy storage and restoration.

Thus, the present invention relates to a compressed gas energy storage and restoration system comprising at least one gas compressor, at least one compressed gas storage means, at least one expansion means for expanding the compressed gas in order to generate energy, and at least one heat storage means, wherein the heat storage means comprises a staged arrangement made up of at least two fixed beds of heat storage particles and at least one discontinuity in the thermal gradient between at least two adjacent beds.

Advantageously, the two fixed beds may be separated by a wall that is permeable to the gas.

According to one embodiment of the invention, one of discontinuities in the thermal gradient may comprise a layer formed of a thermally insulating material, which separates at least two of the fixed beds.

According to one embodiment of the invention, one of the means of providing a discontinuity in the thermal gradient may be provided by at least two of the fixed beds containing particles of a phase change material.

Advantageously, the at least two fixed beds may comprise particles of a phase change material with different melting points and may each be situated near one of the ends of the heat exchange.

Preferably, the at least two fixed beds may comprise particles of phase change materials with different melting points and may be situated in second position in the arrangement when moving from one end of the heat exchange toward the other end.

According to one embodiment of the invention, a mainly axial passage for the compressed gas through the fixed beds may be induced an injecting and of withdrawing compressed gas which is positioned axially with respect to the heat storage.

Advantageously, the heat storage may comprise additional gas injectors and gas withdrawing apparatus means situated at least at one stage of the staged arrangement of fixed beds of storage particles.

According to one embodiment of the invention, the additional compressed gas injectors and gas withdrawal means may comprise a distribution grating interposed between the beds that make up the stage.

Advantageously, a layer formed of a thermal insulating material may be positioned against one of the faces of the grating.

In addition, the invention relates to a compressed gas energy storage and gas restoration method in which the following steps are performed:
  a) compressed a gas;
  b) cooling the compressed gas by exchange of heat in a heat storage;
  c) storing the cooled gas;
  d) heating the cooled compressed gas by restoration of heat in the heat storage; and
  e) expanding the heated compressed gas to generate energy,
wherein, in order to store and restore heat, the gas passes through the heat storage, the heat storage comprising a staged arrangement formed of at least two fixed beds of heat storage particles, and at least one discontinuity in the thermal gradient between at least two adjacent beds.

According to one embodiment of the invention, the gas may be injected and withdrawn at the ends of the heat storage.

Advantageously, the gas may be injected and withdrawn at/at least one intermediate fixed bed.

According to one embodiment of the invention, the following steps may be implemented:

i) storing the heat in a first portion of the fixed beds by a first exchange of heat with the gas;
  ii) storing the heat in a second portion of the fixed beds with a second exchange of heat with the gas; and
  iii) restoring the heat of the first and/or second portion by exchange of heat with the gas.

BRIEF DESCRIPTION OF THE DRAWINGS

Further features and advantages of the system and of the method according to the invention will become apparent from reading the following description of nonlimiting exemplary embodiments, with reference to the attached figures described hereinbelow.

FIGS. 2 and 3 also depict temperature gradients within the heat storage.

FIG. 4 also depicts the temperature gradient within the heat storage.

FIGS. 7a, 7b and 7c depict a heat storage according to one embodiment of the invention, for three consecutive charges respectively. FIGS. 7a, 7b and 7c also depict the temperature gradients within the heat storage.

FIGS. 8a, 8b and 8c depict a heat storage according to one embodiment of the invention, respectively for three consecutive discharges which take place sequentially in groups of stages from the bottom of the storage upward. FIGS. 8a, 8b and 8c also depict the temperature gradients within the heat storage.

DETAILED DESCRIPTION OF THE INVENTION

Figure 1:
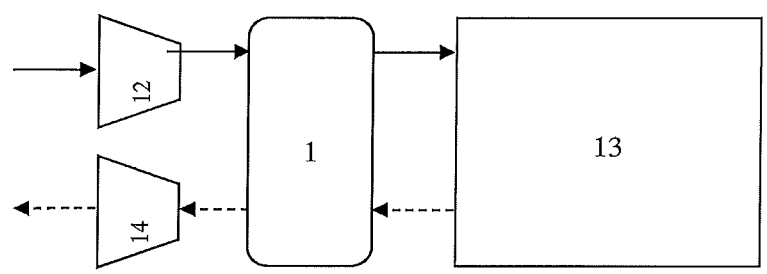
FIG. 1 illustrates a compressed gas energy storage and restoration system according to the invention.

The present invention relates to a compressed gas energy storage and restoration system equipped with a heat storage (for example of the AACAES type). In this embodiment, the pressurized gas (often air) is stored cold. The system according to the invention comprises:
  at least one gas compressor (or compression means), and preferably several staged gas compressors. The gas compressors may be driven by a motor and notably an electric motor;
  at least one means for storing (also referred to as a reservoir) the compressed gas compressed by the gas compressors. The compressed gas storage may be a natural reservoir (for example an underground cavity) or otherwise. The compressed gas storage may be at the surface or beneath the ground. In addition, the gas storage may be formed as a single volume or of as a plurality of volumes which may or may not be interconnected;
  at least one expander or turbine of the gas (also referred to as a means for expanding), allowing the compressed and stored gas to be expanded, and preferably using several staged gas expanders. The gas expander allows energy, notably electrical energy, to be generated, by a generator;

at least one heat storage allowing storage of the heat derived from the compressed gas during the energy storage phase and allowing the stored heat to be restored to the compressed gas during the energy restoration phase. According to the invention, the heat storage comprises a staged arrangement formed of at least two fixed beds with each fixed bed being formed of heat storage particles. The particles forming each of the fixed beds exchange heat with the gas during the energy storage and restoration phases with the heat being stored in the particles between these two phases. A fixed bed collects the heat storage particles in which the particles are immobile. A staged arrangement of beds is the name given to beds which are superposed above one another. According to the invention, the heat storage comprises at least one means for forming a discontinuity in the thermal gradient between at least two adjacent beds. A discontinuous thermal gradient is a thermal gradient that has breaks in the gradient of its line, i.e. that a derivative of the curve representing the change in temperature in the heat storage means according to the invention cannot be continuously differentiated.

The terms "staged compression" (and, respectively, "staged expansion") are used when a plurality of compressors (respectively expanders) compressed means for expanding are mounted in succession one after the other in series. The compressed (respectively expanded) gas leaving the first compressor (respectively expansion) means then passes into an (respectively expansion) expansion means, and so on. A compression or expansion of the plurality of staged compressors or expansion means is then referred to as a compression or expansion stage. Advantageously, when the system comprises a plurality of compressor and/or expansion stages, a heat storage (exchange) is placed between each compressor and/or expander. Thus, the compressed gas is cooled between each compression, making it possible to optimize the efficiency of the next compression, and the expanded gas is heated between each expansion, making it possible to optimize the efficiency of the next expansion. The number of compression stages and the number of expansion stages may be between 2 and 10 and preferably between 3 and 5. Preferably, the number of compressor stages is the same as the number of expander stages. Alternatively, the compressed gas energy storage and recuperation system (for example of AACAES type) according to the invention may contain a single compressor and a single expander.

According to an alternative form of embodiment of the invention, the compressor, staged or otherwise, may be reversible, which means to say that it can operate both for compression and for expansion. Thus, it is possible to limit the number of devices employed in the system according to the invention, allowing a saving in terms of weight and volume in the system.

According to an alternative form of embodiment, the heat exchange means used between the compression stages may be those used between the expansion stages.

The system according to the invention is suited to any type of gas and notably to air. In this case, the inlet air used for the compression may be taken from the ambient air, and the air leaving after expansion may be released into the ambient air. In the remainder of the description, only the alternative form of embodiment using compressed air, and its AACAES application will be described. However, the system and the method are valid for any other gas.

The heat storage means make it possible, when storing the compressed gas (compression), to recuperate a maximum amount of heat originating from the compression of the gas at the outlet of the compressors and to reduce the temperature of the gas before it passes on to the next compression or before storage of the compressed gas. For example, the compressed gas may pass from a temperature higher than 150° C., (for example approximately 190° C.) to a temperature of below 80° C. (for example of around 50° C.). The heat storage means make it possible, during energy restoration, to restore a maximum amount of stored energy by increasing the temperature of the gas before it passes on to the next expansion. For example, the gas may pass from a temperature of below 80° C. (for example of around 50° C.) to a temperature higher than 150° C. (for example of around 180° C.).

FIG. 1 illustrates one nonlimiting exemplary embodiment of a compressed gas energy storage and restoration system according to the invention, such as an AACAES system. In this figure, arrows drawn in solid line illustrate the circulation of the gas during the compression steps (energy storage steps) and arrows drawn in dotted line illustrate the circulation of the gas during the expansion steps (energy restoration steps). This figure illustrates an AACAES system comprising a single compression stage 12, a single expansion stage 14 and a heat storage system 1. The system comprises a storage reservoir 13 for storing the compressed gas. The heat storage system 1 is interposed between the compression/expansion stage 12 or 14 and the storage reservoir 13 for storing the compressed gas. Conventionally, during the energy storage (compression) phase, the air is first of all compressed in the compressor 12 then cooled in the heat storage system 1. The compressed and cooled gas is stored in the reservoir 13. The heat storage particles of the heat storage system 1 are hot following the cooling of the compressed gas in the compression phase. During energy restoration (expansion), the stored compressed gas is heated in the heat storage system 1. Next, in the conventional way, the gas passes through one or more expansion stages 14 (one stage according to the example illustrated in FIG. 1).

The system according to the invention is not restricted to the example of FIG. 1. Other configurations may be envisioned: a different number of compression and/or expansion stages, the use of reversible means providing the compression and the expansion, etc.

According to the invention, the heat storage comprises at least one means for forming a discontinuity in the thermal gradient between at least two adjacent beds. A discontinuity in the thermal gradient within the storage means makes it possible to limit the natural convection movements within the heat storage which are potentially generators of thermally nonuniform zones (the formation of cold pockets) which detract from the efficiency of the system which are thus avoided. Thus, the heat storage of the compressed gas energy storage and restoration system according to the invention allows control over the thermal gradient and does so within one and the same single heat storage. Thus, the system according to the invention offers good operability during exploitation and an advantageous cost, while at the same time allowing optimized energy storage and restitution.

According to one embodiment of the invention, the heat storage is of substantially cylindrical shape. For example, the heat storage has the shape of a column, which can be positioned for example vertically with the axis of the column corresponding to the vertical axis. According to one embodiment of the invention, the fixed beds of particles of the heat storage are superposed along the axis of revolution of the heat storage.

According to one embodiment of the invention, the heat storage comprises compressed gas injection and gas withdrawal means placed perpendicular to the direction of stratification induced by the superposition of the fixed beds of particles. Thus, the stream of compressed gas passes through the staged arrangement of fixed beds in a direction that is chiefly axial with respect to this staged arrangement. According to this embodiment, the stream of compressed gas passes through the fixed beds in succession one after the other and because the heat storage means according to the invention comprises at least one means for forming a discontinuity in the thermal gradient between at least two adjacent beds which induces thermal stratification is induced within the storage means (with at least one discontinuity in the thermal gradient) with the temperature being relatively uniform in a direction that is radial with respect to the stack of beds.

According to one embodiment of the invention, a fixed bed comprises a gas-permeable wall, such as a grating, and a stack of heat storage particles on this wall. A staged arrangement of such fixed beds makes the upstream uniform charging with granular solid easier and tends to allow a better radial homogeneity of the temperature which is essential for correct operation of the system. This embodiment may advantageously and nonlimitingly be combined with the embodiments which will be detailed later on in the description hereinbelow.

The figures illustrative of embodiments of the present invention will hereafter be represented in a nonlimiting and a nonexclusive manner a heat storage in the form of a column. The fixed beds of particles of the heat storage are superposed along an axis of revolution of the column, and the heat storage comprises gas injection and withdrawal means perpendicular to the stratification induced by the stacking of fixed beds.

According to one embodiment of the invention, a discontinuity in the thermal gradient between at least two adjacent beds is obtained by separating the fixed beds using a layer comprising a thermally insulating material, through which the gas can pass. The insulating material may be any material with very low thermal conductivity known to those skilled in the art. According to one embodiment in which the fixed beds comprise a wall that is permeable to the gas, a layer free of solid particles (for example filled with air, the air being the thermally insulating material) is interposed between such fixed beds. The layers of thermal insulation make it possible to limit the diffusion of temperature from one fixed bed of particles to another. The use of thermally insulating layers thus makes it possible to obtain thermal stratification (discontinuous thermal gradient) within the heat storage means and better redistribution of the gas. Moreover, the separation of the fixed beds with layers of thermal insulation (with, in addition, an impermeable wall in the case of an insulating layer that is free of solid) allows better distribution of the solid particles within the storage and thus makes it possible to limit hydrodynamic and thermal heterogeneities which detract from the efficiency of the system.

According to one embodiment of the invention, a layer comprising a thermally insulating material is interposed between each fixed bed of particles that makes up the heat storage. The thermal gradient within the heat storage according to the invention is therefore a stepped thermal gradient, allowing optimal exploitation of the compressed gas energy storage and restitution system according to the invention.

Figure 2:
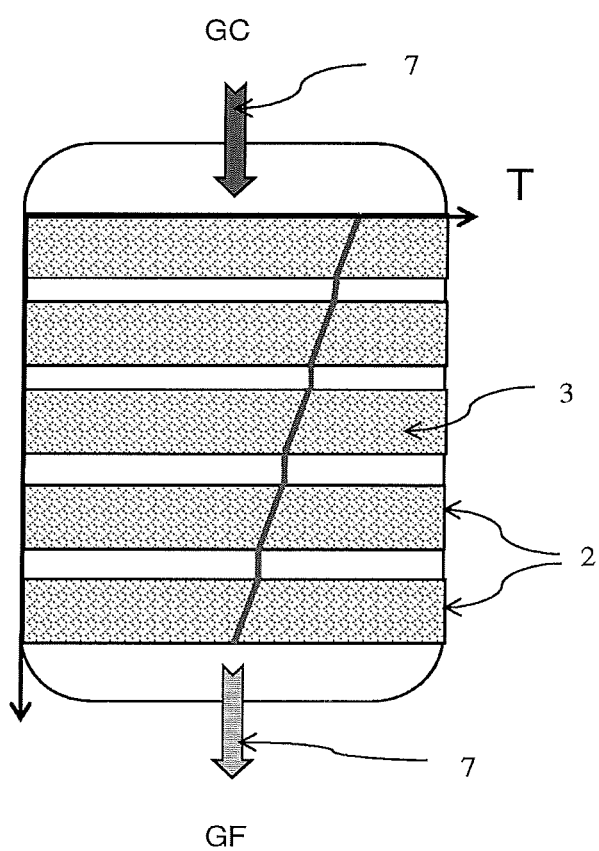
FIGS. 2 and 3 illustrate a heat storage system according to one embodiment of the invention, respectively during the charging and the discharging of the heat storage.
Figure 3:
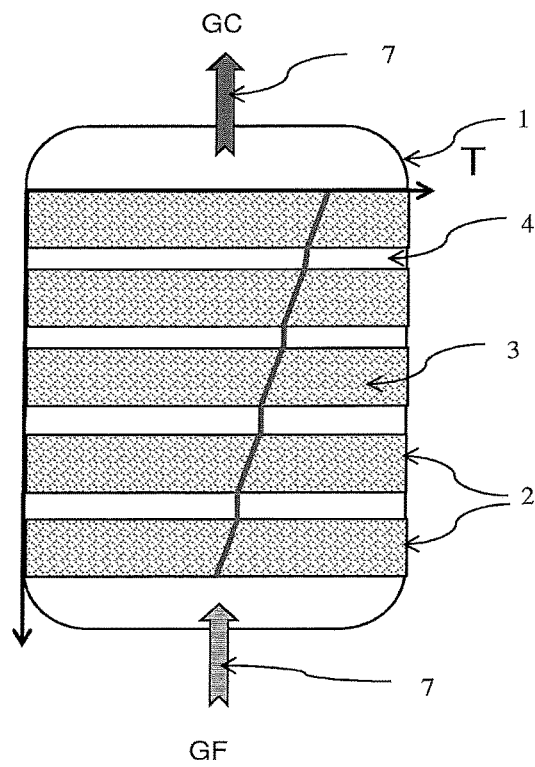

FIGS. 2 and 3 illustrate an exemplary embodiment of the heat storage 1 of the compressed gas energy storage and restoration system in the case of the storage phase (also referred to as "charging" hereinafter; FIG. 2) and in the case of the restoration phase (also referred to as "discharging" hereinafter; FIG. 3). According to this alternative form of the system according to the invention, the heat storage 1 is a column and is made up of five fixed beds 2 of particles 3 arranged one above the other with each bed being separated from the adjacent beds by a layer of thermal insulation 4. FIGS. 2 and 3 also show the direction of the stream of compressed gas 7, imparted by compressed gas injection means and gas withdrawal means 8 placed perpendicular to the direction of the stratification induced by the two fixed beds of particles which may be a grating 6 and a layer of thermal insulation 4. In particular, dark arrows represent the main direction of the hot gas whereas light arrows represent the main direction of the cold gas. As the heat storage means 1 is being charged, as illustrated in FIG. 3, the hot gas GC (leaving the gas compressor) is injected via the upper end of the column 1. Thus, the arrangement of the heat storage according to the invention forces the compressed gas to circulate in the axial direction with respect to the fixed beds which causes the fluid that is to be heated or cooled to circulate, from one bed to another, in a direction perpendicular to the stack of fixed beds that form the heat storage, which in this instance is in the axial direction of the heat storage (in this case of the column). During discharging of the heat storage 1, as illustrated in FIG. 3, the cold gas GF (leaving the compressed gas storage or an expander) is injected via the lower end of the column 1. The cold gas GF passes axially through the fixed beds 2, one after another. The hot gas GC is then extracted from the column 1 in the upper part to be directed toward the expander of the system according to the invention. By way of illustration, the evolution of the curve of temperatures T within the storage means according to this embodiment is depicted artificially in solid line in these figures. It may be noted that the thermal gradient does indeed exhibit discontinuities, from one bed to another with the discontinuities being induced by the layers of thermal insulation interposed between two adjacent fixed beds.

According to another embodiment, a discontinuity in the thermal gradient between two adjacent fixed beds is obtained by using particles containing a phase change material (PCM) which is characterized by different melting points for each of the fixed beds of particles in question. The use of phase change materials with different melting points for the fixed beds of the heat storage makes it possible to induce a stepped thermal gradient into the storage, and thus to limit the phenomena of thermal diffusion from one fixed bed of particles to another during storage phases. Another advantage of these materials lies in the fact that they allow a reduction in the volume of the shell, making it possible to store a large quantity of energy in the form of latent heat. A compromise between efficiency and cost may also be reached by combining PCMs with storage materials that use sensible heat to store the heat, in one and the same bed. Phase change materials that can be used include the following materials: paraffins with a melting point of below 130° C., salts which melt at temperatures above 300° C., mixtures (eutectics) which make it possible to have a broad range of melting points.

According to one embodiment of the invention, at least one fixed bed with PCM particles is positioned near the inlet of the heat storage and/or a fixed bed with PCM particles is positioned near the outlet of the heat storage. What is meant by the inlet of the heat storage is the point at which the hot compressed gas is introduced into the heat storage, and what is meant by the outlet of the heat storage is the point at which the hot compressed gas leaves the heat storage. It should be noted that the inlets and outlets of the heat storage may vary during the exploitation of the compressed gas energy storage system according to the invention. This configuration makes it possible to enjoy the advantages of PCMs for controlling the thermal gradient and reducing the volume of solid while at the same time reducing the overall cost because PCMs on the whole are more expensive than sensible-heat materials. For this alternative form, the melting points of the two phase change materials are chosen to ensure a certain level of temperature of the cold air heading toward the storage (on the cold side) and the hot air heading toward the turbine of the AACAES (on the hot side). Optionally, a fixed bed of particles of a material that stores heat in the form of sensible heat may be positioned before the hot-side PCM fixed bed stage and/or after the cold-side PCM fixed bed stage, in order to absorb any variations in inlet temperature of the heat storage (compressor outlet during charging and compressed air storage outlet during discharging). At any time, the PCM stages contain a phase change front, with a certain percentage of the mass in the solid state and the remainder in the liquid state.

Thus, for this embodiment, the temperature in a PCM material that is at the phase change temperature remains constant during the exchange of heat, as long as the change of phase is occurring (exchange of latent heat). The chief advantage with this embodiment is therefore that it ensures a constant inlet and outlet temperature for the heat storage system, which will not vary with the cycling if the amount of PCM has been correctly assessed (the 2, solid/liquid, phases need to be present at all times in order to be sure of keeping the T constant). Thus, the key advantage with this embodiment is that it improves control over the thermal gradient.

The melting point for the PCM on the hot side may be between 50 and 500° C., more preferably between 100 and 400° C., and more preferably still, between 100 and 350° C. The melting point of the PCM on the cold side is between 0 and 500° C., more preferably between 5 and 200, and more preferably still, between 10 and 100° C.

Figure 4:
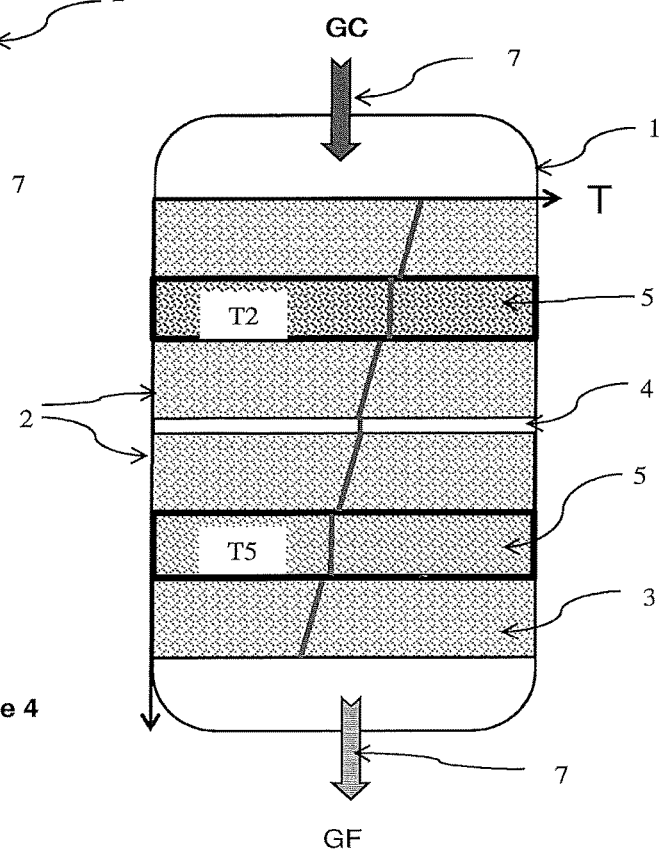
FIG. 4 illustrates a heat storage system according to one embodiment of the invention, during the charging of the heat storage.

One example of this embodiment is shown in FIG. 4. In this example, the heat storage means 1 has the form of a column, the hot (and respectively cold) side being situated at the top (and respectively the bottom) of the column, and is made up of six fixed beds 2 of particles, two of these beds 2 being formed of PCM particles 5, and the other four beds 2 being formed of sensible-heat particles 3. According to this nonlimiting exemplary embodiment of the invention, the fixed beds of PCM particles 5 are placed in the second position with respect to the inlet and outlet of the compressed gas of the heat storage means. During the charging phase depicted in FIG. 4, the hot gas GC (leaving the compressor) is injected via the upper end of the column 1. The hot gas passes axially through the fixed beds 2, passing from one to another in succession. The cooled gas GF is then extracted from the column 1 in the lower part to be stored in the compressed gas storage of the AACAES system or alternatively to be injected in a further compression step. During discharging (not depicted) of the heat storage 1, the gas follows the reverse path (cold gas entering from the bottom and hot gas leaving from the top). The beds of PCM particles 5 thus positioned notably make it possible to ensure that the thermal steps at the inlet and outlet of the heat storage are maintained well over time. By way of illustration, the evolution in the curve of temperatures T within the storage according to this embodiment is artificially depicted in this figure in solid line. It may be noted that the thermal gradient does indeed have discontinuities, from one bed to another, because of the use of PCMs that have different melting points from one bed to another.

According to one particular embodiment of the invention, each of the fixed beds of particles of the storage comprises particles containing phase change materials (PCMs) that are characterized by different melting points. The melting points of the various phase change materials are chosen to ensure a predetermined temperature gradient in the multi-staged bed. The temperature differences within each bed with respect to the mean for the bed in question are then very small, and the thermal gradient is then a stepped thermal gradient, each step being very markedly differentiated from the next, allowing very good control over the temperature gradient within the heat storage. Optionally, a layer of storage material that stores heat as sensible heat may be placed before the hot side first PCM stage and/or after the cold side final PCM stage, in order to absorb any potential variations in TES inlet temperature (outlet from the compressor during charging, outlet from the compressed air storage or from an expansion stage during discharging).

Figure 5:
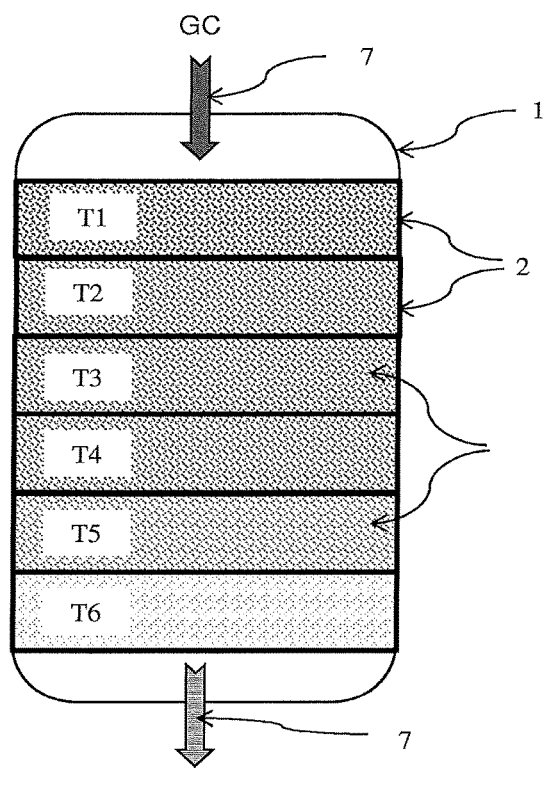
FIG. 5 illustrates a heat storage system according to one embodiment of the invention, during the charging of the heat storage.

One exemplary embodiment of such an embodiment of the invention is given in FIG. 5. In this example, the heat storage means 1 takes the form of a column, the hot (or respectively cold) side being situated at the top (or respectively at the bottom) of the column, and is formed of six fixed beds 2 of PCM particles 5. The PCM particles 5 of each fixed bed 2 have different melting points T1, T2, T3, T4, T5 and T6, with T6<T5<T4<T3<T2<T1. The fixed bed with the PCMs of melting point T1 are on the hot side (injection/withdrawal of the hot gas GC), and the fixed bed with the PCMs of melting point T6 are on the cold side (injection/withdrawal of cold gas GF). During the charging phase depicted in FIG. 5, the hot gas GC (leaving the compressor) is injected via the upper end of the column 1. The hot gas passes axially through the fixed beds 2, passing from one to another in succession. The cooled gas GF is then extracted from the column 1 in the lower part to be stored in the compressed gas storage of the AACAES system or alternatively to be injected in a further compression step. During discharging (not depicted) of the heat storage 1 the gas follows the reverse path (the cold gas entering from the bottom and the hot gas leaving from the top). The key advantage of staging the PCMs is to provide better control over the thermal gradient and therefore better control over the inlet/outlet temperatures of the storage during charging/discharging cycles.

According to one embodiment of the invention, the heat storage of the compressed gas energy storage and restoration system according to the invention may comprise both one or more fixed beds of PCM particles and one or more layers comprising a thermally insulating material. A fixed bed comprising PCM particles is able for example to be separated from another fixed bed, which may or may not involve PCM particles, by a layer of thermal insulation. These two ways of keeping the temperature within the fixed beds uniform, while at the same time allowing discontinuities in the thermal gradient, when used in combination make it possible to optimize control of the thermal gradient of temperatures within the heat storage.

The range of temperatures over which the heat storage means can operate is between 0° and 500° C., more preferably between 100 and 400° C., and more preferably still, between 100 and 350° C. The temperature levels are dependent both on the complete method and on the type of materials used for the particles of the fixed beds of the heat storage.

In the configurations described hereinabove, the gas injection means and the withdrawal means are provided at the ends of the heat storage. As an alternative, additional gas injection means and withdrawal means may be provided at intermediate levels of the heat storage. Thus, the system of the present invention may be provided with additional injection and withdrawal points at each stage (at each fixed bed), which make it possible, advantageously, to control the flow rate of fluid passing through each stage. This alternative form of embodiment is compatible with all the conceivable configurations described hereinabove for the heat storage.

One advantage with this embodiment is that the injection and withdrawal system per stage makes it possible to reduce pressure drops in the system and gain better control over the temperature gradient in the fixed bed. Specifically, injections/withdrawals which are as close as possible to the thermal gradient make it possible to limit pressure drops (as the number of beds passed through is reduced) while at the same time maintaining good heat transfer performance. Thus, and depending on the height of the thermal gradient in comparison with the height of the bed, a very significant reduction in the pressure drop can be achieved. For this embodiment, the thermal gradient is discontinuous between the individualized fixed beds situated between the additional injections and withdrawals used, which means that the fixed beds are for storing or restoring heat.

Figure 6:
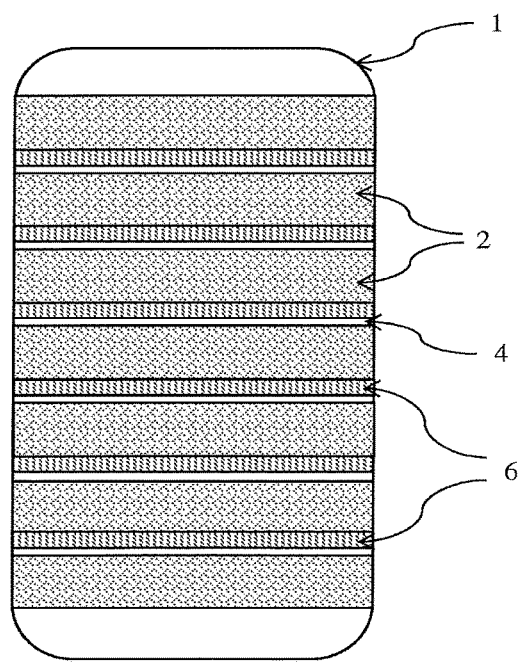
FIG. 6 illustrates a heat storage system according to one embodiment of the invention.

According to one embodiment of the invention, the additional injection means and gas withdrawal means of the heat storage comprises a distribution grating which is interposed between two fixed beds of particles. The stream of compressed gas induced by these additional injections and withdrawals comprises a local radial component (in the region of the grating and around the grating) but the stream of compressed gas passing through the beds of the staged arrangement nevertheless remains chiefly axial. Preferably, a layer of thermal insulation is positioned against one of the faces of the grating, which limits exchanges of heat between the beds between which the distribution grating is fitted. FIG. 6 shows a nonlimiting exemplary embodiment of a storage 1 comprising additional gas injection means and withdrawal means comprising a grating 6 and a layer of thermal insulation 4 which are inserted between each stage of fixed beds 2 of particles.

FIGS. 7a, 7b to 7c illustrate in a nonlimiting manner three consecutive phases of charging of a heat storage system which is a column. The hot (or respectively cold) side being situated at the top (respectively at the bottom) of the column and made up of seven stages of fixed beds of particles. The storage of this embodiment comprises main gas injections (dark arrows) and gas withdrawals (light arrows) 7 and, furthermore, additional injections (dark arrows) and gas withdrawals (light arrows) 8 installed at each stage which are interposed with a layer of thermal insulation. The axial temperature gradient T, at the start of each of these phases, is artificially represented in the multi-staged bed in the form of a solid line. During the first phase of charging (FIG. 7a) the hot gas GC is injected from the top and distributed over one or more stages (the number of stages may vary according to the flow rate for example). According to this example, charging takes place over three stages (FIG. 7a) at the same time, which means that the hot fluid passes through three stages before leaving the heat storage means via a first additional gas withdrawal situated between the third and fourth beds. When the charging temperature is reached in these stages, the injection takes place via an additional injection 8 directly into one of the lower stages (FIGS. 7b and 7c). Thus, such a system can be charged sequentially, in stages, or groups of stages, from the inlet to the outlet, making it possible to limit pressure drops because the gas does not pass through the whole bed of particles.

For this alternative form of embodiment, the discharging process may also take place sequentially, in groups of stages, from the bottom of the storage upward. During this phase, discharging may also take place over a different number of stages, as illustrated in FIGS. 8a to 8c where discharging takes place in groups of five or four stages.

Figure 9A:
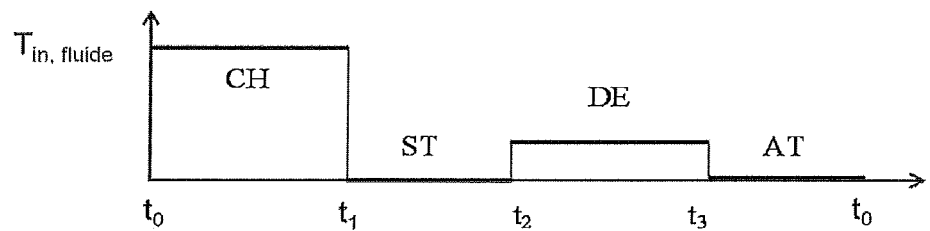
FIG. 9a illustrates an example of a cycle of use of an AACAES system and FIGS. 9b and 9c illustrate evolution in time of an axile profile along an axis of revolution.

FIG. 9a illustrates one example of a cycle of use of an AACAES system. This figure corresponds to the variation in gas temperature at the inlet on the hot side Tin, fluid of the heat storage. The usage cycle comprises a first charging phase CH (storage of energy) between the times t0 and t1, followed by a second storage phase ST (energy storage) between the times t1 and t2, followed by a discharge phase DE (energy restoration) between the times t2 and t3, and a standby phase AT between the times t3 and t0.

Figure 9B:
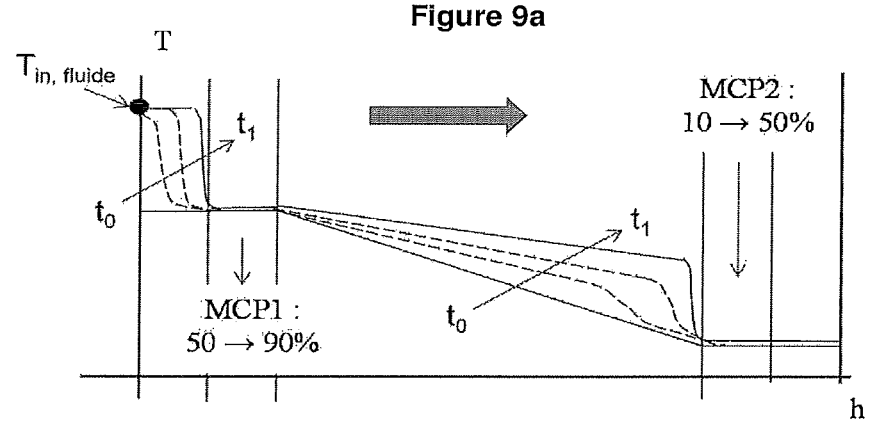
Figure 9C:
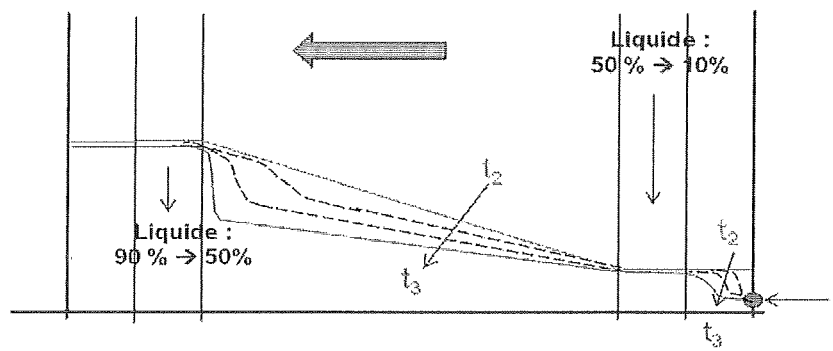

FIGS. 9b and 9c depict the evolution with respect to time of the axial profile along the axis of revolution of the heat storage means with h being the distance measured along this axis of the temperature T in the fixed beds during the charging and discharging phases of the cycle of use of FIG. 9a. For this example, the heat storage corresponds to the embodiment of FIG. 4, for which the heat storage comprises two fixed beds with PCMs with each fixed bed of PCM having a different melting point and being positioned near (in the second position) the ends of the heat storage. In these figures, the vertical lines limit the fixed beds comprising the PCM particles. FIG. 9b corresponds to the charging phase CH of FIG. 9a, and FIG. 9c corresponds to the discharging phase DE of FIG. 9a.

FIG. 9a indicates that, at the beginning of the cycle (at t0) the fixed bed with the PCM1 particles on the hot side of the heat storage contains 50% of the mass in the solid state and 50% in the liquid state. During charging, the hot gas passes through the heat storage, entering via the hot side. The liquid fraction increases with latent heat being stored in the PCM1 stage. The temperature is kept constant (and equal to the melting point of the PCM1). At the end of charging, 90% of the PCM1 is in the liquid state.

The temperature gradient becomes established in the part of the TES which is filled with s sensible-heat storage material.

On the cold side, the PCM2 stage initially contains 10% liquid and 90% solid. During charging, its temperature is kept constant (and equal to the melting point of the PCM2). At the end of charging, 50% of the PCM2 is in the liquid state.

The process is reversed during the discharging phase between t2 and t3. In FIG. 9c it may be seen that the cold fluid enters via the cold side and is heated up, absorbing latent heat in the PCM2 stage and decreasing the proportion of liquid in this stage (which reverts to 50% to 10%). The temperature is still kept constant (and equal to the melting point of the PCM2).

A new temperature gradient becomes established in the part of the TES which is filled with sensible-heat storage material.

On the hot side, in the PCM1 stage, the quantity of liquid decreases as the fluid passes and changes from 90% to 50%, with the temperature still being kept constant (and equal to the melting point of the PCM1).

The present invention also relates to a compressed gas energy storage and restoration method in which the following steps are performed:
a) compressing a gas, notably by a compressor;
b) cooling the compressed gas by an exchange of heat particularly in a heat storage;
c) storing the cooled compressed gas, notably with a compressed gas storage;
d) heating the stored compressed gas by exchange of heat in the heat storage; and
e) expanding the heated compressed gas in order to generate energy, for example by a turbine in order to generate electrical energy.

According to the invention, the heat storage comprises at least two fixed beds of heat storage particles and at least one discontinuity in the thermal gradient between at least two adjacent beds. This multistaged arrangement of fixed beds of particles combined with a discontinuity in the thermal gradient makes it possible to create thermal stratification within the storage but also allows better control over the porosity of each of the beds thereby avoiding the formation of cold pockets which detract from the efficiency of the system. Thus the energy storage and restoration are optimized.

According to one aspect of the invention, the method comprises several successive compression steps, using compressors placed in series, also referred to as staged compressions. In this case, steps a) and b) are repeated for each compression stage. Thus the gas is compressed and cooled several times.

According to one feature of the invention, the method comprises several successive expansion steps, using expanders placed in series, also referred to as staged expansions. In this case, steps d) and e) are repeated for each expansion stage. Thus the gas is heated and expanded several times.

Step a) involves compressing a gas, for example air. This may notably be air taken from the ambient environment.

Step b) allows the compressed gas to be cooled after each compression step, making it possible to optimize the efficiency of the next compression and/or the storage of energy. The heat storage makes it possible, when storing the compressed gas (compression), to recuperate a maximum amount of heat originating from the compression of the gas at the outlet of the compressors and to reduce the temperature of the gas before it passes on to the next compression or before storage. For example, the compressed gas may pass from a temperature higher than 150° C., for example approximately 190° C., to a temperature of below 80° C., for example of around 50° C.

Step c) may be performed within a compressed gas storage means which may be a natural reservoir (for example an underground cavity) or otherwise. The compressed gas storage may be at the surface or below the ground. In addition, it may be formed of a single volume or of a plurality of volumes that may or may not be interconnected. During storage, the compressed gas storage is closed.

The compressed gas is stored until such time as the stored energy is to be recuperated. Step d) and the following are performed at the time at which the stored energy is to be retrieved.

Step d) allows the compressed air to be heated before each expansion, thereby making it possible to optimize the efficiency of the next expansion. For step d) it is possible to use the heat storage particles that were used for cooling during step b). The heat storage means make it possible, during energy restoration, to restore a maximum amount of stored energy by increasing the temperature of the gas before it passes on to the next expansion. For example, the gas may pass from a temperature of below 80° C., for example of around 50° C., to a temperature higher than 150° C., for example of around 180° C.

During step e), the compressed gas is expanded. Expanding the compressed gas makes it possible to generate energy. This expansion may be performed by a turbine which generates electrical energy. If the gas is air, the expanded air may be discharged into the ambient environment.

The method according to the invention can be implemented using the system according to any one of the alternative forms of the invention which have been described hereinabove (alone or in combination).

The method according to the invention may notably comprise a heat storage and/or restoration step comprising one or more of the features below:
  exchanging heat in a plurality of fixed beds,
  axially circulating gas from one bed to another,
  an injecting and withdrawing of gas at ends of the heat storage and/or at intermediate location, and
  the heat storage particles may be particles of phase change material which may be placed in fixed beds located near ends of the heat storage,
  circulating hot gas from the upper part toward the lower part of the column or, vice versa, from the lower part toward the upper part of the column, etc.

According to one alternative form of embodiment of the method, the charging and discharging of the heat storage may be sequential. In particular, for the embodiment in which the gas is injected and/or withdrawn at intermediate levels (FIGS. 7 and 8), the method may comprise the following steps:
i) stored heat in a first portion of the fixed beds by a first exchange of heat with the gas, for example with the upper fixed beds of the heat storage, the hot gas being injected into the heat storage by injectors and withdrawal means situated in the upper part of the heat storage, and the cold gas is withdrawn from the heat storage by injection and withdrawal situated at an intermediate location of the heat storage;
ii) the heat is stored on a second portion of the fixed beds by a second exchange of heat with the gas, for example with lower fixed beds of the heat storage, the hot gas being injected into the heat storage by injectors and withdrawal means situated in an intermediate part of the heat storage means and the cold gas being withdrawn from the heat storage by injectors and withdrawal means situated at an intermediate level, or in the lower part of the heat storage; and
iii) the heat of the first and/or second portion is restored by exchange of heat with the gas with the cold gas being injected into the heat storage by the injectors and the withdrawal means situated in the lower part of the heat storage and the hot gas is withdrawn from the heat storage by injection and withdrawal means situated at an intermediate level or in the upper part of the heat storage.

This embodiment makes it possible to limit pressure drops within the heat storage.

Advantageously, steps i) and ii) may be repeated for other portions of the fixed beds of the heat storage.

According to an alternative form, heat may be restored for just a portion of the fixed beds of the heat storage.

The method and system according to the invention can be used for storing intermittent energy such as wind or solar energy so that this energy can be used when desired.

The invention claimed is:

1. A compressed gas energy storage and restoration system comprising:
   at least one gas compressor for compressing gas with each gas compressor providing heated compressed gas;
   at least one compressed gas storage for storing compressed gas from the at least one gas compressor from which heat produced by compression has been removed;
   at least one heat storage, each heat storage storing heat absorbed from the heated compressed gas, the at least one heat storage comprising a staged arrangement containing particles of a phase change material disposed in at least two fixed beds, at least two adjacent fixed beds of the staged arrangement containing particles of the phase change material with the particles of each adjacent fixed bed having a different melting point which creates a discontinuity in a thermal gradient disposed between the at least two adjacent beds and the particles of the phase change material of the at least one heat storage heating the compressed gas stored in the at least one compressed gas storage; and
   at least one expander for producing energy from the compressed gas after heating of the stored compressed gas with the heat stored in the at least one heat storage; and wherein the at least two adjacent fixed beds of particles of the phase change material are separated by a wall permeable to the gas.

2. The system as claimed in claim 1, wherein the discontinuity in the thermal gradient comprises a layer of a thermally insulating material separating at least two of the adjacent fixed beds of particles of the phase change material.

3. The system as claimed in claim 1, wherein the discontinuity in the thermal gradient comprises a layer of a thermally insulating material separating the at least two of the adjacent fixed beds of particles of the phase change material.

4. The system as claimed in claim 1, wherein the discontinuity in the thermal gradient is located between two fixed beds of the particles of the phase change material having different melting points.

5. The system as claimed in claim 1, wherein the discontinuity in the thermal gradient is located between two fixed beds of the particles of the phase change material having different melting points.

6. The system as claimed in claim 2, wherein the discontinuity in the thermal gradient is located between two fixed beds of the particles of the phase change material having different melting points.

7. The system as claimed in claim 3, wherein the discontinuity in the thermal gradient is located between two fixed beds of the particles of the phase change material having different melting points.

8. The system as claimed in claim 4, wherein the at least two of the fixed beds of particles of the phase change material having different melting points are respectively located at opposed ends of the at least one heat storage.

9. The system as claimed in claim 5, wherein the at least two of the fixed beds of particles of the phase change material having different melting points are respectively located at opposed ends of the at least one heat storage.

10. The system as claimed in claim 6, wherein the at least two of the fixed beds of particles of the phase change material having different melting points are respectively located at opposed ends of the at least one heat storage.

11. The system as claimed in claim 7, wherein the at least two of the fixed beds of the phase change material having different melting points are respectively located at opposed ends of the at least one heat storage.

12. The system as claimed in claim 1 comprising an axial passage extending through the at least one heat storage providing a path for compressed gas to flow through the fixed beds of phase change material of the at least one heat storage.

13. The system as claimed in claim 12, wherein the at least one heat storage comprises gas injection means and gas withdrawal means located at a face of at least one stage of the staged arrangement of the at least two fixed beds of particles of the phase change material.

14. The system as claimed in claim 13 in which the gas injection means, and the withdrawal means comprise a distribution grating located between two fixed beds of particles of the phase change material.

15. The system as claimed in claim 14, comprising a layer of a thermally insulating material contacting one face of the distribution grating.

16. A compressed gas energy storage and restoration method comprising:
   compressing gas with at least one compressor to provide heated compressed gas which is stored in at least one compressed gas storage after heat has been removed from the heated compressed gas;
   storing the heat absorbed from the heated compressed gas in at least one heat storage, the at least heat storage comprising a staged arrangement containing particles of a phase change material disposed in at least two fixed beds, at least two adjacent fixed beds of the staged arrangement containing particles of the phase change material with the particles of each adjacent bed having a different melting point which creates a discontinuity in a thermal gradient disposed between the at least two adjacent beds and the particles of the phase change material of the at least one heat storage;
   heating the compressed gas with the heat stored in the at least one heat storage; and
   expanding the heated compressed gas with at least one expander to produce energy; and wherein the at least two adjacent fixed beds of particles of the phase change material are separated by a wall permeable to the gas.

17. The method as claimed in claim 16, wherein the compressed gas is injected into and withdrawn from ends of the at least one heat storage.

18. The method as claimed in claim 16, wherein compressed gas is injected into and withdrawal from at least one intermediate fixed bed of the phase change particles of the at least one heat storage.

19. The method as claimed in claim 16, comprising:
   storing heat in a first portion of the at least one fixed bed of the phase change particles of the at least one heat storage by a first heat exchange between the heated compressed gas and the phase change particles;
   storing heat in a second portion of the at least one fixed bed by a second heat exchange between the compressed gas and the phase change particles; and
   recovering heat stored in the first and second portions by heating the compressed gas by heat exchange between the first and second portions of the phase change particles and then expanding the heated compressed to generate the energy.

20. The method as claimed in claim 17, comprising:

storing heat in a first portion of the at least one fixed bed of the phase change particles of the at least one heat storage by a first heat exchange between the heated compressed gas and the phase change particles;

storing heat in a second portion of the at least one fixed bed by a second heat exchange between the compressed gas and the phase change particles; and recovering heat stored in the first and second portions by heating the compressed gas by heat exchange between the first and second portions of the phase change particles and then expanding the heated compressed to generate the energy.

21. The method as claimed in claim 18, comprising:

storing heat in a first portion of the at least one fixed bed of the phase change particles of the at least one heat storage by a first heat exchange between the heated compressed gas and the phase change particles;

storing heat in a second portion of the at least one fixed bed by a second heat exchange between the compressed gas and the phase change particles; and recovering heat stored in the first and second portions by heating the compressed gas by heat exchange between the first and second portions of the phase change particles and then expanding the heated compressed to generate the energy.

* * * * *